Nov. 9, 1965 H. DELUGEAU ETAL 3,217,297

SHIFT REGISTER DECODER

Filed Jan. 9, 1962 3 Sheets-Sheet 1

INVENTOR
HENRI DELUGEAU
MICHEL LE DIBERDER
BY Frank R. Trifari
AGENT

INVENTOR
HENRI DELUGEAU
MICHEL LE DIBERDER
BY Frank R. Trifari
AGENT

Nov. 9, 1965 H. DELUGEAU ETAL 3,217,297

SHIFT REGISTER DECODER

Filed Jan. 9, 1962 3 Sheets-Sheet 3

INVENTOR
*HENRI DELUGEAU*
*MICHEL LE DIBERDER*
BY
Frank R. Trifari
AGENT

United States Patent Office 3,217,297
Patented Nov. 9, 1965

3,217,297
SHIFT REGISTER DECODER

Henri Delugeau, Montrouge, and Michel Le Diberder, Le Raincy, Seine, France, assignors to North American Philips Company, Inc., New York, N.Y., a corporation of Delaware Filed Jan. 9, 1962, Ser. No. 165,198
2 Claims. (Cl. 340—168)

This invention relates to a circuit arrangement for the detection or decoding of a predetermined group of successively transmitted binary code elements. More particularly, it relates to a shift register decorder useful, for example, in a remote-control device.

In most remote-control devices it is essential that errors in the transmission (for example, due to interruption of the communication or to defective circuit elements or to the presence of disturbing signals) should not result in the reception of erroneous command signals. Generally, the omission of command signals is permissible; the omission of a transmitted command signal permits the possibility of stating the defect, which may then be effectively repaired.

The transmission of a command signal in the case of remote-control and the excution thereof are performed, for reasons of safety, in two separate cycles:

(1) At the main station: transmission of the information corresponding to the command to be executed; at the associated substation: decoding of the information and retransmission to the main station;

(2) At the main station: checking of the correspondence of the transmitted information ith the incoming retransmitted information and transmission of a command to execute the order; at the associated substation: execution of the order and transmission of a confirmation signal to the main station.

The reasons for this double operation cycle are due to the required safety in executing an order. It will be obvious, for example, that no error whatever is permissible in railway signalling systems or electric distribution systems.

Since, with the existing systems, decoding of the transmitted information generally involves a simulaneous recording of the information, an erroneous operation of the decoding arrangement may result in an erroneous interpretation, which can be assessed only by the retransmission to the main station.

It will be obvious, however, that such a system involves a fairly great loss of time and, in addition, a comparatively high comsumption of energy. Moreover, since this system requires the use of a double transmission track, the apparatus used is fairly complicated.

The object of the present invention is to provide a decoding circuit for a remote-control system, in which a binary code can be received by means of a single transmission path, and in which any possibility of errors in the interpretation of the code is removed; the system of the invention thus provides a high degree of safety.

In accordance with the circuit arrangement of the invention, a first series of bistable triggers is provided and there corresponds to each of the transmitted code elements at least one bistable trigger of the first series which includes a setting terminal, a firing terminal and an output terminal and which supplies an output pulse only when a pulse has first been fed to the setting terminal and subsequently a pulse is fed to the firing terminal while the firing terminals of the bistable triggers corresponding to code elements of the same value are united to form a common firing terminal to which a prepolarizing current is normally fed; the prepolarization compensates for the effect of the pulses fed to the setting terminals.

A second series of bistable triggers is also provided, the output terminal of a bistable trigger of the second series being coupled with the setting terminal of a corresponding trigger of the first series and the output terminal of a bistable trigger of the first series being coupled with the firing terminal of a corresponding, next-following trigger of the second series. The circuit further includes a code element detector, which determines the value of the code elements and which, subsequent to the reception of a code element, temporarily interrupts the prepolarizing current fed to the common firing terminal of the first series of bistable triggers corresponding to the said value. Subsequent to the reception of the first code element of the group the detector feeds a pulse to the setting terminal of a first bistable trigger of the second series, the output terminal of which is coupled with the setting terminal of the bistable trigger joined to the first code element. The circuit also includes a pulse producer which feeds a pulse during each interruption of the prepolarizing current to the firing terminals of the triggers of the second series united to form a common firing terminal, the arrangement being such that the output pulse of the first bistable trigger of the second series is transmitted in order of succession by the bistable triggers of the first series corresponding to the code group and finally energizes a detector.

In this manner the switching operations are carried out in order of succession, no information being converted into a parallel code, so that there are no erroneous interpretations due to a circuit defect.

In order that the invention may be clearly understood and readily carried into effect, it will now be described more fully with reference to the accompanying, in which.

Figure 1:
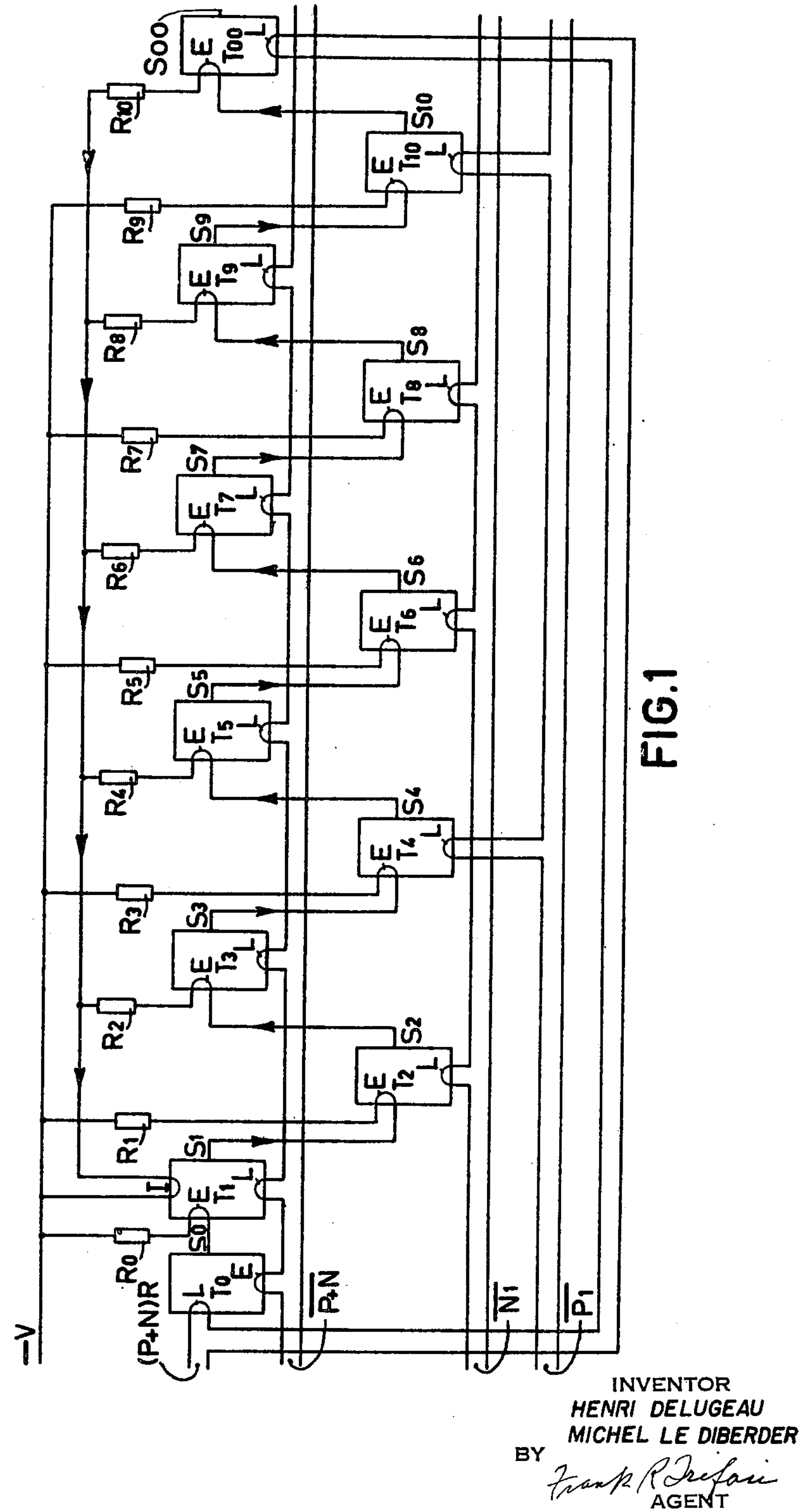
FIG. 1 shows an address-decoding circuit according to the invention arranged in a substation.

The address-decoding circuit or identification circuit shown in FIG. 1 comprises twelve bistable triggers T0, T1, . . . T10, T00, which are shown schematically in block form. These triggers may comprise vacuum tubes, transistors, relays or cores; in the embodiment shown each trigger comprises a magnetic core having a rectangular hysteresis loop, operating in conjunction with a transistor amplifier. Such a bistable trigger is known, for example, from United States Patent 3,015,742. A bistable trigger is to be understood to denote herein a circuit comprising a setting terminal, termed hereinafter a "writing winding" E, a firing terminal, termed hereinafter "reading winding" L, and an output terminal S. This circuit supplies output pulses only when a pulse has first been fed to the setting terminal and subsequently a pulse is fed to the firing terminal. The operation of this bistable trigger is based on the fact that the core with the rectangular hysteresis loop has two states of remanence, i.e. a positive and a negative state, which are designated by "1" and "0," the transition from the state "0" to the state "1" corresponding to a writing operation, which is carried out by means of a positive pulse at the writing winding E, whereas the transition from the state "1" to the state "0" corresponds to a reading operation, which is performed under the control of a positive pulse at the reading winding L; the relative senses of winding of the writing and reading windings determine the polarity of the remanence of the core.

When the core passes from the state "1" to the state "0" a positive pulse occurs at the output terminals S which can be transmitted to the writing winding of a next-following core, which passes in consequence to the state "1."

It should be noted that during the transition of a core from the state "0" to the state "1" no pulse occurs at the corresponding output terminal S.

The first core T1 includes an additional winding I, the purpose of which will be described hereinafter. The sense of winding is such that the operation is identical to that of the reading winding L.

The bistable triggers T0 to T00 are connected in cascade. The transistor amplifiers coupled with these members are fed from a suitable negative direct-voltage source —V via the resistors R0, R1, . . . R9, R10.

The various decoding operations are performed under the control of four pulse sources $\overline{P+N}$, (P+N)R, $\overline{P1}$ and $\overline{N1}$, which will be described more fully with reference to FIG. 2 (part A).

The code elements of the information are transmitted in a binary code so that each of the said code elements may be either of two different types P and N. The elements P and N may be represented, in the case of line transmission, by direct-voltage or alternating-voltage pulses of different polarities, frequencies or phases. The information transmitted by the main station is received in a receiver not shown in FIG. 1, which receiver converts the information in known manner, so that the pulses P and N (FIG. 2) yields:

(1) A first sequence of regular pulses $\overline{P+N}$ due to a current I in the rest position and due to the absence of this current for a time T during each code element of the information;

(2) A second sequence of regular pulses (P+N)R, due to the absence of a current in the rest position and due to the presence of a positive current I for a time T during each code element of the information; at pulses of this second sequence exhibit a time lag which may be of the order of 5 microseconds with respect to the pulses of the first sequence. The term "R" in (P+N)R is used to indicate this delay or retardation;

(3) A third sequence of pulses $\overline{N1}$ due to the absence of a current I for a time $3T/2$ after the termination of the pulses N;

(4) A fourth sequence of pulses $\overline{P1}$ due to the absence of the current I for a time $3T/2$ after the termination of the pulses P.

Figure 2:
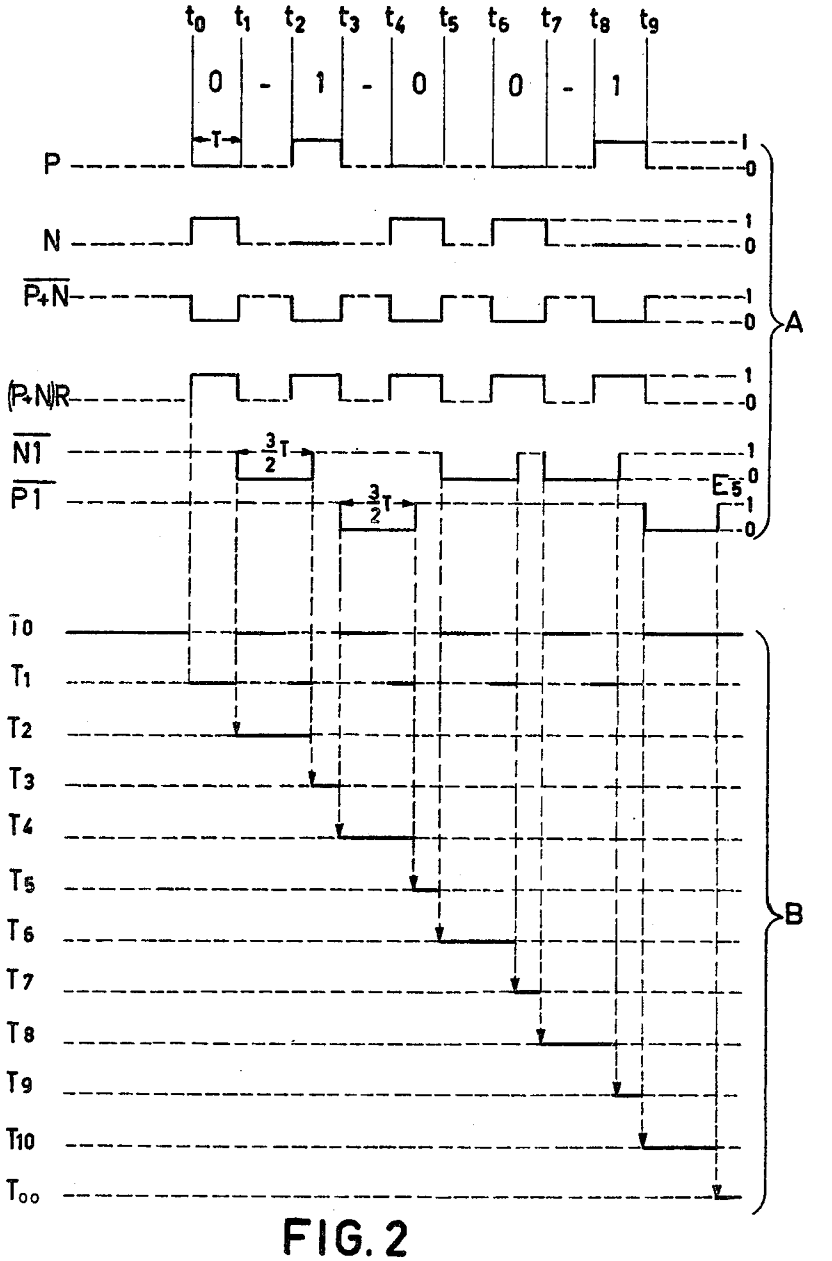
FIG. 2 shows a time diagram of an example for explaining the operation of the various bistable trigger circuits of the circuit shown in FIG. 1, the triggers being controlled by signals derived from the transmitted signal.

The example for explaining the operation of the circuit arrangement of FIG. 1 is that shown in FIG. 2 wherein the coded information is 01001. From FIG. 2 it will be seen that a rest interval of duration equal to that of a code element of the information separates each element from the next-following element. The waveform of this information is given, of course, only by way of example; the elements may be transmitted consecutively without time interval or with different intervals, in which case means must be provided for a suitable determination of the pulse duration of $\overline{N1}$ and $\overline{P1}$. It is also noted that the time 3T/2 is not critical and is only given by way of example; it is only necessary that there be an overlap between a pulse $\overline{N1}$ or $\overline{P1}$ and the pulse in (P+N)R as shown in FIG. 2(A). Since any time duration is permissible provided this requirement is met, the manner of determining a particular time interval has not been shown.

The arrangement shown in FIG. 1 operates as follows:

In the rest position only the bistable trigger T0 is in the state "1" under the control of a positive $\overline{P+N}$ pulse, while its writing winding is connected to the appropriate pulse source.

When the pulse corresponding to the first code element occurs at the instant $t_0$, $\overline{P+N}$ becomes zero and the corresponding positive pulse (P+N)R controls the transition of T0 to the state "0," the reading winding of which is connected to the pulse source (P+N)R.

The transition of T0 from the state "1" to the state "0" produces a positive pulse at S0 which, when transmitted to the writing winding of the trigger T1, changes over the latter to the state "1."

At the instant $t_1$ the positive pulse $\overline{P+N}$ changes over the trigger T1 from the state "1" to the state "0" and the resulting pulse produced at the output terminal S1 controls the transition of T2 to the state "1." The transition of T2 to the state "1" is only possible by the interruption of the current from the source $\overline{N1}$ passing through the reading winding at the instant $t_1$. This interruption of the current from the source $\overline{N1}$ at the instant $t_1$ determines that the first code element of the transmitted information is a "0." If this element were a "1," the reading winding of T2 had to be connected to the pulse source $\overline{P1}$, which would produce an interruption of the current at the instant. $t_1$.

It follows therefrom that the preliminary recorded code element in T0 cannot pass over from T1 to T2 unless via the identification circuit of the substation, the address of which corresponds to the transmitted, coded information.

At the instant $t_2$+T2 the trigger T2 receives a current I at the reading winding, connected to the pulse source $\overline{N1}$. This current causes the trigger to pass to the state "0" and the output pulse at S2 causes the trigger T3 to pass to the state "1."

The reading winding of the latter is connected to the pulse source $\overline{P+N}$. Consequently, at the instant $t_3$ the said trigger T3 returns to the state "0" and provides a pulse at the output terminal S3, which controls the transition of T4 to the state "1," since the reading winding thereof is connected to the pulse source P1, which interrupts the current supply at this instant (since the second code element of the information is a 1).

From the time-order diagram of the triggers T0 to T00 (B in FIG. 2), determined by the control-pulse diagrams (A of FIG. 2), it will be seen that the code element 1, previously recorded in the trigger T0 passes through the identification circuit under the control of the pulse $\overline{N1}$ and $\overline{P1}$, which characterize the transmitted information.

The arrangement of the triggers T2, T4, T6, T8, T10 is such that their reading windings are connected either to the source $\overline{N1}$ or the source $\overline{P1}$, in accordance with the value of the code elements of the predetermined code group.

Since the triggers are connected in cascade, any defect of the operation of either of them interrupts the course of the information across the arrangement, which means that a given element of the circuit cannot pass to the state "1," so that the information is only lost and cannot be interpreted erroneously.

When the information element arrives at T10, the transition of which to the state "1" has taken place at the instant $t_9$ (diagram B of FIG. 2), the positive current E5 of the source $\overline{P1}$ causes the trigger concerned to pass to the state "0" at the instant $t_9+3/2T$ and the pulse obtained at S10 controls the transition of T00 to the state "1." The latter determines the identity of the code group transmitted. At the termination of the pulse sequence, T00 of the substation, the address of which corresponds to the said information, is in the state "1" and this substation is capable of receiving the next-following information, which defines the order to be performed.

The trigger T0 passes successively from the state "1" to the state "0" and conversely under the control of the respective pulses (P+N)R and P+N during the duration of the code group received from the main station. At each transition from the state "1" to the state "0" the pulse occurring at the output terminal S0 causes the trigger T1 to pass to the state "1." The return of T1 to the state "0" must not be controlled as before by the pulse $\overline{P+N}$. Since if at the instant $t_5$, at which the trigger T5 controls the transition to the state "1" of the trigger T6, the trigger T1 would pass to the state "0," the pulse occurring at the output terminal S1 would control the transition of T2 to the state "1," since at this instant no current is fed to $\overline{N1}$ (see time diagram of FIG. 2). This would result in the introduction of a second information element into the identification circuit, which has to be avoided. It is therefore necessary in this particular case to control the return of the trigger T1 to the state "0," if $\overline{N1}$ conveys current, in order to suppress any possibility of a transition of T2 to the state "1."

If the first code element were an element 1, it would be required to perform the return of T1 to the state "0," when $\overline{P1}$ conveys a current, since in this case the reading winding of T2 is connected to the pulse source $\overline{P1}$. In general, it is therefore required that $\overline{N1}$ and $\overline{P1}$ should supply current simultaneously.

This possibility is provided, as will be seen from the time diagram (A in FIG. 2), during a time $T/2$ between the leading edges of the positive pulses of the sources $\overline{N1}$ or $\overline{P1}$ and the leading edges of the positive pulses of the source $\overline{P+N}$.

The positive pulses $\overline{N1}$ or $\overline{P1}$ control the transition of the even-numbered triggers to the state "0," while a pulse $s$ is produced at the outputs S of the said triggers, which pulse controls the transition to the state "1" of the next-following odd-numbered trigger. It is therefore possible to control by the same pulse $s$ the return of T1 to the state "0," as is illustrated in FIG. 1, in which case the winding I is connected in series with the writing windings of the even-numbered triggers. At this instant the reading winding of the trigger T2 receives a positive current either from the source $\overline{N1}$ or from the source $\overline{P1}$ (in accordance with the value of the first element of the coded information), while T2 cannot pass to the state "1."

The function of the odd-numbered triggers of the arrangement consists in storing the information element passing through the circuit between two successive even-numbered triggers. Two successive code elements of the information may be of the same type, which is for example the case with the code elements 3 and 4 in the embodiment shown of 01001. The reading windings concerned of the even-numbered triggers i.e. T6 and T8 are connected in series with the same pulse source $\overline{N1}$. In order to cause T6 to return to the state "0" and T8 to pass to the state "1," the source $\overline{N1}$ had to supply simultaneously a positive pulse and perform an interruption of the current in accordance with the type of this arrangement, which is not possible. It is therefore necesasry to use a separation interval during which an auxiliary trigger, in this case the trigger T7, holds the information element and hence passes to the state "1."

This is furthermore favorable to the operation of the trigger T1, which is to be returned to the rest position before the trigger T2 can be marked by an interruption of the current from $\overline{N1}$ or $\overline{P1}$, as stated above. Between the successive current interruptions from $\overline{N1}$ and/or $\overline{P1}$ both $\overline{N1}$ and $\overline{P1}$ must have a positive current. This condition can be fulfilled, if an even-numbered trigger as stated above is available.

Figure 3:
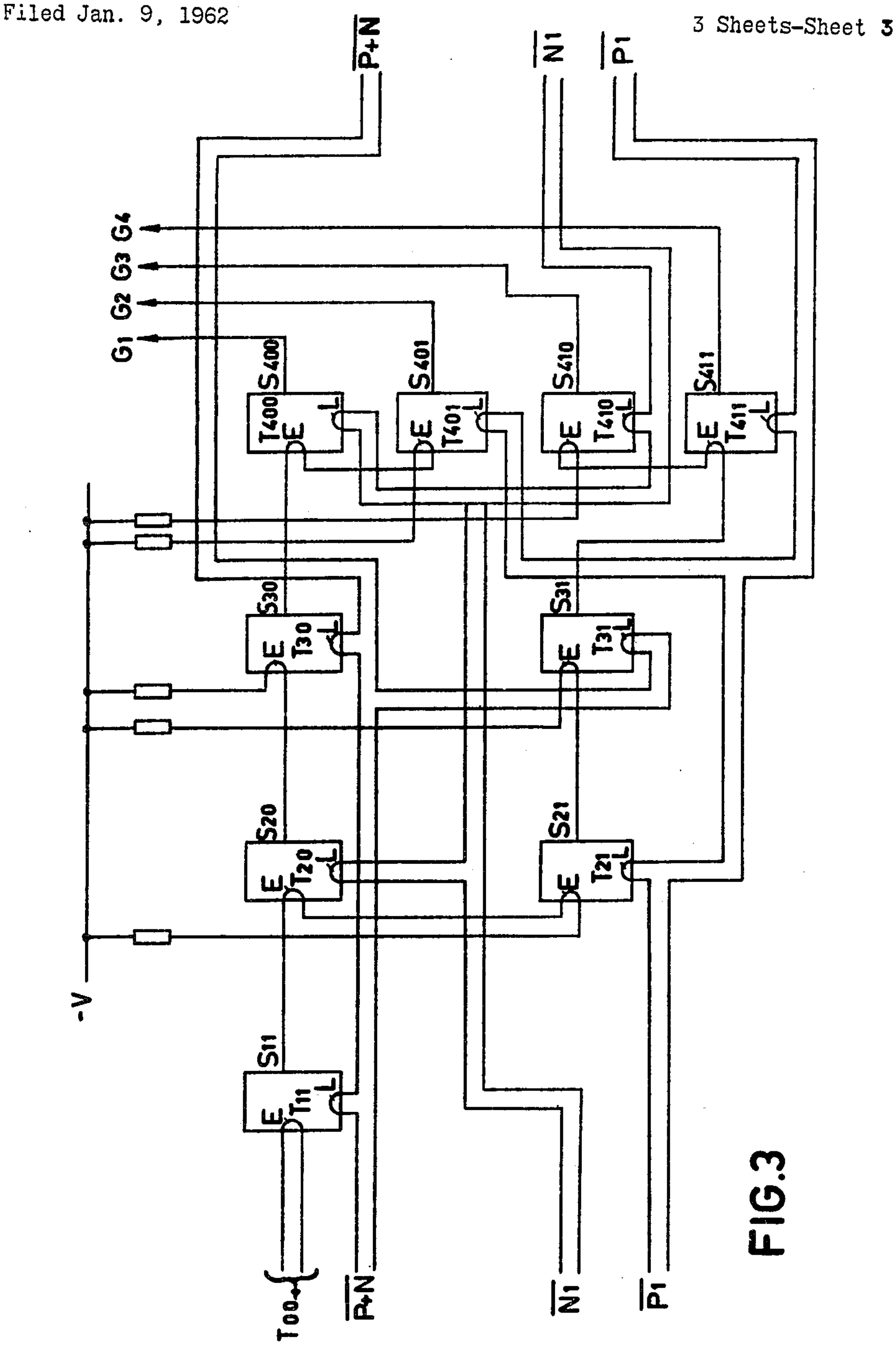
FIG. 3 shows part of the circuit for decoding "orders" in a substation.

FIG. 3 shows part of the decoding arrangement for the "orders" in a substation. In the embodiment shown the information relating to an order to be executed comprises four code elements 1 or 0, so that it is possible to transmit sixteen orders of different type.

The diagram of FIG. 3 relates to the first part of the decoding circuit; the identity is determined for the two first code elements of the information. The outputs G1, G2, G3 and G4 correspond to the coded information elements 00, 01, 10, 11 and are connected to a circuit corresponding with that of FIG. 2, the following sixteen different combinations being thus obtainable.

| D.389 | | Order information | Outputs (not shown) |
|---|---|---|---|
| 00 | G1 | 0000 | G11 |
| | | 0001 | G12 |
| | | 0010 | G13 |
| | | 0011 | G14 |
| 01 | G2 | 0100 | G21 |
| | | 0101 | G22 |
| | | 0110 | G23 |
| | | 0111 | G24 |
| 10 | G3 | 1000 | G31 |
| | | 1001 | G32 |
| | | 1010 | G33 |
| | | 1011 | G34 |
| 11 | G4 | 1100 | G41 |
| | | 1101 | G42 |
| | | 1110 | G43 |
| | | 1111 | G44 |

From the foregoing it will be seen that at the termination of the reception of the information relating to the address of the substation concerned, T00 is in the state "1." A short rest interval separates the transmission of the address from the transmission of the order.

The first pulse (P+N)R, marking the beginning of the order information causes the trigger T00 to pass to the state "0" and the pulse produced at S00 controls the transition of T11 (FIG. 3) to the state "1."

The pulse $\overline{P+N}$ causes T11 to return to the state "1" and the output pulse at S11 controls either T20 or T21 in accordance with the nature of the first code element of the information. If the element is a 0, $\overline{N1}$ is zero at this instant and $\overline{P1}$ is positive, so that T20 changes over to the state "1." If this element is a 1, $\overline{N1}$ is positive and $\overline{P1}$ is zero at this instant, so that T21 passes to the state "1."

The termination of the interruption of current from $\overline{N1}$ or $\overline{P1}$ controls the return of T20 or T21 respectively to the state "0." The corresponding pulse produced at S20 or S21 respectively controls the transition of T30 or T31 respectively to the state "1."

The positive pulse $\overline{P+N}$ following the former controls the return of T30 or T31 to the state "0" and the corresponding pulse produced at S30 or S31 respectively controls the transition on the one hand of T400 or T401 or on the other hand of T410 or T411 to the state "1" in accordance with the nature of the second code element. The following table is a survey of this process.

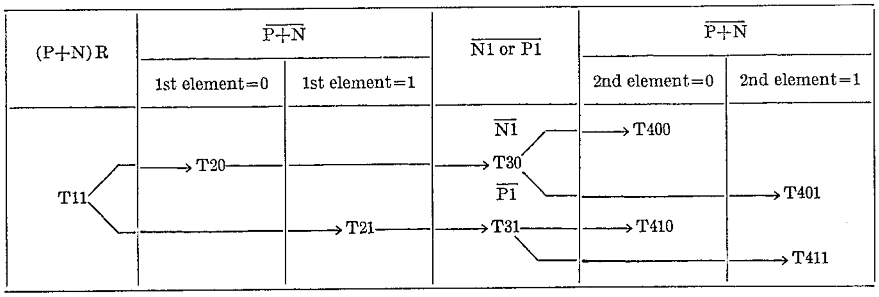

In the foregoing it has been stated that each of the outputs G1, G2, G3, G4 is connected to a circuit of the kind shown in FIG. 3. At the termination of the current interruption of $\overline{N1}$ or $\overline{P1}$, so that either T400 or T410 have passed to the state "1" or T401 or T411 have passed to this state, the operative trigger returns to this state, the operative trigger returns to the state "0" and the pulse concerned at the output controls the transition of the trigger T11′ to the state "1" (this trigger is not shown; it corresponds with the trigger T11 of FIG. 3). The same occurs with the two last code elements of the information.

It will be obvious that the fundamental principle of the address decoding and of the order decoding is the same. An identification circuit of bistable triggers is available the connections of which define the information to be decoded, and an auxiliary circuit of triggers for each of the identification triggers repeating the transmitted information, this information being detected by a single bistable trigger controlled by the progressing information element, recorded previously in the input trigger of the arrangement. Thus any defect becomes manifest by the loss of an address or of an order.

As a matter of course, the foregoing is to be considered only by way of example, since other elements, such as relays, vacuum tubes or transistors instead of cores may be employed within the scope of the present invention.

What is claimed is:

1. A shift register decoder for decoding a predetermined group of binary code elements, comprising: first and second series of bistable triggers, each trigger comprising a set terminal, a firing terminal and an output terminal, each trigger supplying an output pulse at its output terminal only when a pulse is fed to its set terminal and subsequently a current is fed to its firing terminal, each trigger of the first series corresponding to a particular code element, a first common shift line coupled to all the firing terminals of the triggers in the first series corresponding to code elements in said predetermined group having one binary value, a second common shift line coupled to all the firing terminals of the triggers in the first series corresponding to code elements in said predetermined group having a second binary value, means for applying a prepolarizing current to both common shift lines, the output terminal of each trigger of the second series being coupled to the set terminal of a corresponding trigger of the first series, the output terminal of each trigger of the first series being coupled to the set terminal of the next-following corresponding trigger of the second series, pulse means for temporarily interrupting the pre-polarizing current in one of said common shift lines dependent on the value of a received code element, means for applying a set pulse to the set terminal of the first trigger of the second series, the output terminal of the first trigger of the second series being coupled to the set terminal of the first series corresponding to the first code element of said predetermined group, and means for applying a pulse to the firing terminals of all the triggers of the second series during each said interruption of the pre-polarizing current, whereby an output pulse is obtained at the output terminal of the last trigger of the first series only after the reception of said predetermined group of code elements.

2. A shift register decoder for decoding a predetermined group of binary code elements, comprising: first and second series of bistable triggers, each trigger comprising a set terminal, a firing terminal and an output terminal, each trigger supplying an output pulse at its output terminal only when a pulse is fed to its set terminal and subsequently a current is fed to its firing terminal, each trigger of the first series corresponding to a particular code element, a first common shift line coupled to all the firing terminals of the triggers in the first series corresponding to code elements in said predetermined group having one binary value, a second common shift line coupled to all the firing terminals of the triggers in the first series corresponding to code elements in said predetermined group having a second binary value, means for applying a prepolarizing current to both common shift lines, the output terminal of each trigger of the second series being coupled to the set terminals of two triggers of the first series corresponding to the two values of a code element, the output terminal of each trigger of the first series being coupled to the set terminal of a next-following corresponding trigger of the second series, pulse means for temporarily interrupting the pre-polarizing current in one of said common shift lines dependent on the value of a received code element, means for applying a set pulse to the set terminal of the first trigger of the second series, the output terminal of the first trigger of the second series being coupled to the set terminal of the first series corresponding to the first code element of said predetermined group, and means for applying a pulse to the firing terminals of all the triggers of the second series during each said interruption of the pre-polarizing current, whereby an output pulse is obtained at the output terminal of the last trigger of the first series only after the reception of said predetermined group of code elements.

References Cited by the Examiner

UNITED STATES PATENTS

| | | | |
|---|---|---|---|
| 2,781,447 | 2/57 | Lester | 340—168 |
| 2,912,596 | 11/59 | Huang | 235—92 |
| 2,956,124 | 10/60 | Hagelbarger | 340—146.1 |

OTHER REFERENCES

IRE Publication I, transactions on Vehicular Communications, April 1959, pp. 74–85.

IRE Publication II, Proceedings of the IRE, October 1958, pp. 1741–1744.

NEIL C. READ, *Primary Examiner.*